United States Patent [19]

Hanaway

[11] Patent Number: 5,158,373
[45] Date of Patent: Oct. 27, 1992

[54] GUIDE SLEEVE, GUIDE POST AND IMPROVED BALL BEARING ASSEMBLY

[76] Inventor: Ronald L. Hanaway, 30210 E. Eight Mile Rd., Farmington Hills, Mich. 48236

[21] Appl. No.: 646,214

[22] Filed: Jan. 28, 1991

[51] Int. Cl.⁵ .............................................. F16C 31/04
[52] U.S. Cl. .................................... 384/49; 384/30; 384/906
[58] Field of Search .................. 384/49, 906, 30, 43, 384/534, 523

[56] References Cited

U.S. PATENT DOCUMENTS

| | | | |
|---|---|---|---|
| 2,987,348 | 6/1961 | Blazek | 384/30 |
| 3,092,425 | 6/1963 | Conner | 384/30 |
| 4,648,727 | 3/1987 | O'Neil et al. | 384/49 |
| 4,664,534 | 5/1987 | Hanaway | 384/49 |

Primary Examiner—Lenard A. Footland
Attorney, Agent, or Firm—Dykema Gossett

[57] ABSTRACT

In combination, a guide post having a longitudinal slot and a ball bearing cage having a bore adjustably receiving the post and adapted for relative longitudinal and rotary movements, there being an internal annular open top recess in said cage inwardly of one end terminating in an annular flange defining a stop shoulder. An apertured swivel cap is mounted upon the guide post and includes a shank extending into the cage recess. An annular detent on the shank is interlocked with the stop shoulder. A guide pin is threaded through the cap and into the guide post slot and is loosely and slidably registerable with side walls of the slot. The pin traps the cap upon the guide post for longitudinal movements. The cooperating stop shoulder and detent retains the cage upon the cap but for free relative rotary movements.

10 Claims, 1 Drawing Sheet

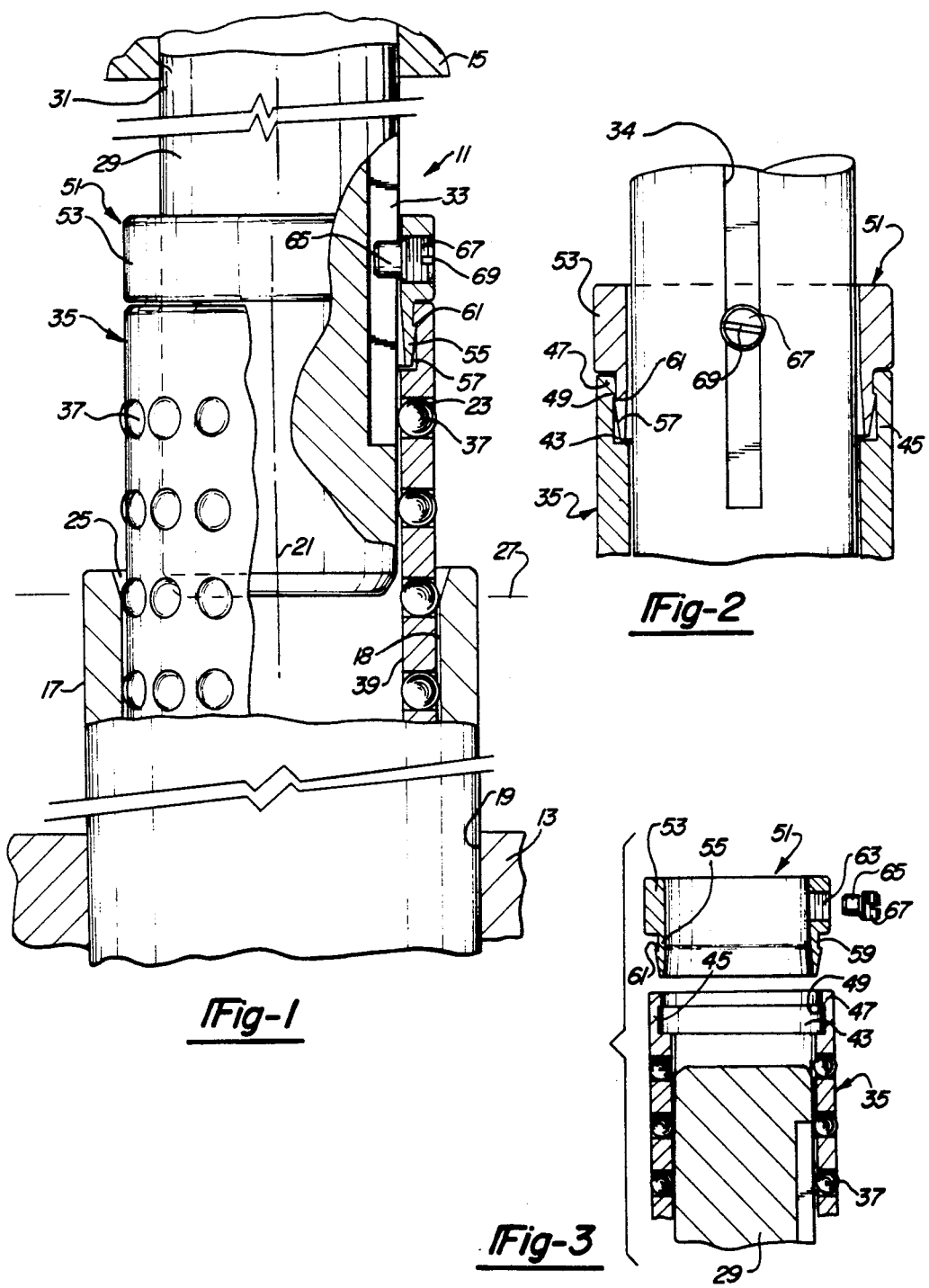

GUIDE SLEEVE, GUIDE POST AND IMPROVED BALL BEARING ASSEMBLY

FIELD OF INVENTION

The present invention relates to a guide sleeve, guide post and bearing assembly for maintaining an alignment of a pair of parallel plates during relative reciprocal movements and wherein upper and lower die shoes may be mounted upon said plates.

BACKGROUND OF THE INVENTION

In the guide sleeve, guide post and bearing assembly of U.S. Pat. No. 4,664,534 dated May 12, 1987, of Applicant's Assignee, one disadvantage was that at times portions of the set screw 51 for trapping the roller 41 within the annular recess 43 of the ball cage 35 had a limited mechanical interference with the adjacent roller 41 as it rolled along guide slot 33.

Further in seeking an entry of the roller 41, FIG. 7 of that Patent, into the interior of the ball cage 35 for entry into the recess 43 there were difficulties in broaching the exterior corners 53 to the radial opening when inserting the roller 41, and the subsequent threading of the bore 49 for insertion of the set screw 51 into the ball retainer or cage so as to trap the roller within the cage recess 43.

Further difficulties were involved in the engineering of a special type of roller 41 with rounded corners at 47, FIG. 6, such as would permit its insertion radially into the bore 49 and ultimately into the recess 43 to prevent any binding of portions of the roller 41 with respect to the cage during relative rotary movements of the cage with respect to the roller as constrained against rotation within the slot 33 of the post 29.

SUMMARY OF THE INVENTION

An important feature of the present invention is to eliminate the roller bearing previously disclosed in said patent retaining the ball cage upon the guide post and for rotatively mounting the cage thereon.

An important feature is to provide in combination a guide post having a longitudinal slot substantially throughout its length having a bottom wall and opposed side walls and a cylindrical ball bearing cage having a coaxial longitudinal axis adjustably mounted upon the post adapted for relative longitudinal and rotary movements thereon and with the cage having an internal annular open top recess. A swivel cap is snap fastened to the roller cage. A radial guide pin is secured to the cap and extends into the slot. The pin is registerable with the side walls of the slot during relative longitudinal movements of the ball cage and cap with respect to the guide post.

As another feature, the guide pin is alternately registerable with opposite ends of the longitudinal slot limiting rectilinear movements of the ball cage relative to the guide post.

As another feature the cage is adapted for rotary movement relative to said swivel cap in a direction at right angles to the longitudinal axis of the guide post.

As still another feature, said end cap traps the ball cage upon the guide post with the cage being free for rotary movement relative to the swivel cap.

The invention may be used in other areas wherein there is a reciprocal relative motion between a pair of parts, such as the parts of a robotic unit.

These and other features and objects will be seen from the following specification and claims in conjunction with the appended drawing.

THE DRAWING

FIG. 1 is a fragmentary partly broken away and sectioned elevational view of the present guide sleeve, guide post and improved bearing assembly as used in conjunction with a pair of relatively movable upper and lower die shoes, fragmentarily shown.

FIG. 2 is a fragmentary right side elevational view thereof with the ball bearing cage and swivel cap partly broken away and sectioned.

FIG. 3 is a fragmentary sectional view corresponding to the upper portion of FIG. 1 with the swivel cap removed and the guide pin separate, before assembly upon the ball bearing cage and guide post.

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Referring to the drawing, FIG. 1, the illustrative die set with guide sleeve, guide post and improved bearing assembly is generally indicated at 11, and includes lower die shoe 13, fragmentarily shown. Overlying the lower die shoe is an upper die shoe 15, fragmentarily shown. It is adapted for vertical reciprocal movements with respect to lower die shoe 13 and with respect to a die set not shown, mounted upon the corresponding die shoes in a conventional manner.

The present guide post, guide sleeve and bearing assembly includes the open ending guide sleeve 17, fragmentarily shown, having a cylindrical bore 18 and press fitted in an upright position within a corresponding aperture 19 in the lower die shoe 13.

Sleeve 17 has a central longitudinal axis 21 and is adapted to receive a corresponding guide post 29 having a similar longitudinal axis 21. The upper end of guide post 29, fragmentarily shown, is press fitted within aperture 31 within upper die shoe 15.

An elongated guide slot 33 with end portions and side walls 34, is fragmentarily shown, formed along substantially the length of post 29 on its exterior. A second guide slot 33 may be formed upon the opposite side of said post if desired. The cylindrical ball cage 35 or ball bearing retainer, in the illustrative embodiment includes a series of longitudinally spaced circles of apertures 23 within which are positioned and entrapped or loosely retained a corresponding plurality of spaced ball bearings 37. These are arranged in longitudinally spaced circles so as to uniformly project through the body of the ball cage exteriorly and interiorly thereof, FIG. 1.

Within the ball bearing retainer 35 adjacent its bore 39 there is provided an internal annular open top recess 43 inwardly of one end thereof of general L shape in cross section. Recess 43 includes annular wall 45 which terminates in the inwardly directed top flange 47 defining annular stop shoulder 49, FIG. 3.

Swivel cap 51 includes an apertured body 53 to loosely receive guide post 29. Shank 55 of reduced diameter depends from said body and includes an annular groove 59. When the cap is assembled onto the ball cage, its top flange 47 is nested and retained within groove 59. Below said groove the shank has an exterior portion that is tapered downwardly and inwardly at 57 defining with groove 59 the detent 61 or detent means. The shank 55 being of reduced thickness is flexible to permit entry of the cap tapered portion 57 past flange 47. This provides a snap interlock between shoulder 49 and detent 61. At the same time, the cage flange 47 locks into cap recess 59, with a snap interlock. This interlock is semi-permanent.

Threaded radial bore 63 in swivel cap body 53 adjustably receives the threaded body 67 at one end of guide pin 65. Said pin, guidably extends into longitudinal slot 33 and is positioned adjacent its bottom and side walls. Guide pin 65 has a screw driver slot 69 in its body 67 to facilitate threading assembly of the pin into cap 51.

In operation the present sleeve 17, guide post 29 and bearing assembly 35 are interposed with respect to the upper and lower die shoes 15 and 13, respectively. Slot 33 within the guide post 29 cooperatively receives the guide pin 65 limiting relative longitudinal movements of the ball bearing cage 35 along the length of post 29, as it intermittently engages opposite ends of slot 33.

Said guide pin is positioned within slot 33 which has a bottom wall and a pair of opposed side walls. Said pin has a point contact with the bottom wall of slot 33. At the same time the pin loosely and slidably registers with the opposed side walls of slot 33.

During conventional reciprocal movements of the guide post 29 with respect to sleeve 17 and with the ball cage 35 mounted upon the guide post and interposed between the post and sleeve 17, longitudinal reciprocal movement of the post effects corresponding longitudinal movements of ball cage 35 with respect to sleeve 17.

While the swivel cap 51 is trapped within slot 33, ball cage 35 is not restrained against rotation with respect to guide post 29 and guide sleeve 17 and is therefore capable of relative rotary movements with respect to both the guide post 29 and sleeve 17. The ball cage is free for such relative rotary movements with respect to the guide post and sleeve when the post and sleeve are disengaged, so that there is no preload. By providing a ball cage which is free for relative rotation, tracking of the balls 37 in the cage with respect to the guide post and sleeve is eliminated and friction is minimized. After each separation there is an opportunity for relative rotation.

In the illustrative embodiment bore 18 of sleeve 17 is slightly over size with respect to the maximum diameter of the ball bearing assembly 35 so that it is free to enter the sleeve during the down stroke. The upper end of sleeve 17 is tapered outwardly as at 25. Inwardly thereof and transversely of said sleeve there is schematically shown a preload line 27. There is an over size relation of the ball bearing assembly after the cage and guide post has lowered into the sleeve, of about 0.001 inches with respect to sleeve 17. Thus there is a preload of the balls with respect to said sleeve and guide post 29. There is a slight expansion of the sleeve as the post and cage enter the sleeve. At the same time, the cage begins to roll up the guide post.

As an improvement and simplification over the disclosure of U.S. Pat. No. 4,664,534 there is provided the present improved swivel cap 51 for the ball cage 35. No roller is needed. A loose snap interlock between the cap and cage permits rotation of the cage relative to said cap. The cap top flange 47 slides within the annular groove 59 of said cap with an annular interlock therebetween.

For assembly or disassembly of ball cage 35 with respect to guide post 21, the guide post 29 first is separated from bushing 17, or axially elevated therefrom. To disassemble, the guide pin 61 is unthreaded and the cap and cage assembly removed. This can be accomplished by manually sliding the ball cage 35 and the connected cap downwardly off of post 27, FIG. 3.

For reassembly the cap and connected ball cage is reassembled over guide post 29, and guide pin 65 is threadedly positioned into guide post slot 33. The swivel cap 51 is trapped within the ball cage 35, with the annular detent 57 in annular recess 43, flange 47 in cap recess 59, and an annular interlock between shoulder 49 and detent 61.

Having described my invention, reference should now be had to the following claims.

I claim:

1. In combination, a guide post having a longitudinal axis and a longitudinal slot substantially throughout its length and having end portions;

a cylindrical ball bearing cage having a co-axial longitudinal bore adjustably receiving said guide post, and adapted for relative longitudinal and rotary movements thereon;

said ball bearing cage mounting a plurality of spaced circularly arranged ball bearings extending substantially the length of said cage and projecting inwardly and outwardly thereof, respectively, there being an internal open top annular recess in said cage spaced inwardly of one end thereof, and terminating in an annular inwardly directed flange at said one end defining an internal annular stop shoulder;

an apertured swivel cap receiving said post mounted upon said cage;

a shank of reduced diameter depending from said cap and extending to said recess;

annular detent means on said shank interlocked with said stop shoulder;

a radial guide pin threaded through said cage and extending into and loosely and slidably registerable with opposite sides of said slot;

said guide pin being alternately registerable with opposite end portions of said slot, limiting rectilinear movements of the ball cage relative to said guide post; and said cage being adapted for rotary movement relative to said swivel cap in a direction at right angles to said axis, said guide pin trapping said cap upon said guide post.

2. In the combination of claim 1, further comprising said open top annular recess having an L shaped cross section.

3. In the combination defined in claim 1, further comprising a guide sleeve having a coaxial longitudinal axis, with said ball cage and guide post projected into said sleeve for relative longitudinal movements and for rotary movements of said cage relative to said sleeve when they are separated.

4. The combination of claim 1, further comprising said swivel cap overlying and loosely retainingly engaging said ball cage.

5. In the combination defined in claim 4, further comprising said swivel cap having the same diameter as and merging with said cage as a continuation thereof.

6. In the combination defined in claim 5, further comprising said guide post and sleeve being upright and at their ends projected into and respectively secured within the upper and lower relatively movable die shoes of a die set assembly.

7. In the combination of claim 1, further comprising said swivel cap including an annular body, said shank depending from said body and being of reduced diameter;

said detent means including an external annular groove in said shank receiving said cage flange; and said shank terminating in a downwardly and inwardly converging tapered portion defining with said groove an annular shoulder.

8. In the combination defined in claim 7, further comprising the reduced thickness of said shank relative to said body and said tapered portion facilitating an axial insertion of said shank into said cage recess and a resilient interlock therewith.

9. In the combination of claim 1, further comprising said guide pin having a threaded slotted head radially threaded through a corresponding radial bore in said cap.

10. In the combination of claim 1, further comprising said guide pin being adjustable so as to guidably engage the bottom wall of said guide post slot.

* * * * *